US010269193B2

(12) United States Patent
Adams et al.

(10) Patent No.: US 10,269,193 B2
(45) Date of Patent: Apr. 23, 2019

(54) AIRCRAFT INFORMATION SYSTEMS

(71) Applicant: Sikorsky Aircraft Corporation, Stratford, CT (US)

(72) Inventors: David Adams, Wallingford, CT (US); Matthew T. Luszcz, Hamden, CT (US); William Fell, Stuart, FL (US)

(73) Assignee: SIKORSKY AIRCRAFT CORPORATION, Stratford, CT (US)

( * ) Notice: Subject to any disclaimer, the term of this patent is extended or adjusted under 35 U.S.C. 154(b) by 25 days.

(21) Appl. No.: 15/671,945

(22) Filed: Aug. 8, 2017

(65) Prior Publication Data

US 2019/0051065 A1  Feb. 14, 2019

(51) Int. Cl.
*B64F 5/60* (2017.01)
*G07C 5/08* (2006.01)

(52) U.S. Cl.
CPC .............. *G07C 5/0816* (2013.01); *B64F 5/60* (2017.01); *G07C 5/085* (2013.01)

(58) Field of Classification Search
CPC .......... G07C 5/0816; G07C 5/085; B64F 5/60
See application file for complete search history.

(56) References Cited

U.S. PATENT DOCUMENTS

| 6,556,902 | B2 | 4/2003 | Ing et al. | |
|---|---|---|---|---|
| 9,505,487 | B2 | 11/2016 | Miener | |
| 2006/0287778 | A1* | 12/2006 | Oltheten | G01D 7/002 701/1 |
| 2010/0235019 | A1* | 9/2010 | De Bono | G01C 23/005 701/14 |
| 2015/0001336 | A1* | 1/2015 | Eglin | B64C 27/04 244/6 |
| 2016/0055685 | A1* | 2/2016 | Lilly | G07C 5/0808 701/1 |

* cited by examiner

*Primary Examiner* — Behrang Badii
*Assistant Examiner* — Daniel L Greene
(74) *Attorney, Agent, or Firm* — Cantor Colburn LLP

(57) ABSTRACT

A computer implemented method for displaying aircraft systems information on an aircraft display relating to and facilitating operation of an aircraft are disclosed herein. The method can include displaying a plurality of system indicators in a system indicator region of an aircraft display. At least two of the indicators of the plurality of system indicators in the system indicator region are disposed in a structurally approximated relationship relative to each other to increase system recognition and/or interpretation of status of a corresponding physical system indicated by each indicator.

20 Claims, 7 Drawing Sheets

AIRCRAFT INFORMATION SYSTEMS

BACKGROUND

1. Field

The present disclosure relates to aircraft systems, more specifically to aircraft information systems, e.g., for processing and displaying information relating to aircraft systems.

2. Description of Related Art

Current aircraft incorporate numerous air vehicle and mission capabilities that require the pilot and/or the crew to disseminate the data and make decisions based upon that data. In order to reduce required display space, a way to provide the critical air vehicle information efficiently and in a manner that is easily interpreted is required.

Conventional methods and systems have generally been considered satisfactory for their intended purpose. However, there is still a need in the art for improved aircraft information systems. The present disclosure provides a solution for this need.

SUMMARY

In accordance with at least one aspect of this disclosure, embodiments of a computer implemented method for displaying aircraft systems information on an aircraft display relating to and facilitating operation of an aircraft are disclosed herein. The method can include displaying a plurality of system indicators in a system indicator region of an aircraft display. At least two of the indicators of the plurality of system indicators in the system indicator region are disposed in a structurally approximated relationship relative to each other to increase system recognition and/or interpretation of status of a corresponding physical system indicated by each indicator.

In certain embodiments, displaying can include displaying the plurality of system indicators such that at least one of the plurality of system indicators can include a representative image having a shape similar to the corresponding physical system and/or a component thereof. In certain embodiments, displaying can include displaying the plurality of system indicators such that the plurality of system indicators include a least one of a main rotor indicator, an engine system indicator, a transmission system indicator, an air vehicle status indicator, and/or a secondary rotor indicator.

In certain embodiments, displaying can include displaying the plurality of system indicators such that the engine system indicator, the transmission system indicator, and the air vehicle status indicator are displayed below the main rotor indicator. In certain embodiments, displaying can include displaying the plurality of system indicators such that the secondary rotor indicator is disposed behind the main rotor indicator.

In certain embodiments, displaying can include displaying the plurality of system indicators such that the main rotor indicator includes at least one horizontal rectangular shape. In certain embodiments, displaying can include displaying the plurality of system indicators such that the secondary rotor includes at least one vertical rectangular shape.

In certain embodiments, displaying can include displaying the plurality of system indicators such that the engine system indicator includes a cylindrical shape. In certain embodiments, displaying can include displaying the plurality of system indicators such that one or more of the indicators can be a first color, a first outline, and/or at a first illumination in a normal indication state and can be a second color and/or second illumination at an alert state.

In certain embodiments, the normal indication state can be a normal operating condition of the aircraft system corresponding to each indicator, wherein the first color can be transparent, or wherein the first illumination can be less than the second illumination. In certain embodiments, the alert state can be a caution and/or failure state of the aircraft system corresponding to each indicator, wherein the second color can be opaque or brighter than the first color, or wherein the second illumination can be greater than the first illumination. In certain embodiments, displaying can include displaying the plurality of system indicators such that at least one of the indicators can include a text or symbol within the indicator to signify a state of the indicator or corresponding aircraft system.

In accordance with at least one aspect of this disclosure, an aircraft display system can include a display configured to display information to a pilot or crew of the aircraft, and an aircraft computer operatively connected to the display, the computer configured to execute any suitable embodiment of a method and/or any suitable portion as disclosed. In accordance with at least one aspect of this disclosure, a non-transitory computer readable medium comprising computer executable instructions for performing a method for displaying aircraft systems information on an aircraft display relating to and facilitating operation of an aircraft, the method being any suitable embodiment of a method and/or any suitable portion thereof as disclosed.

These and other features of the systems and methods of the subject disclosure will become more readily apparent to those skilled in the art from the following detailed description taken in conjunction with the drawings.

BRIEF DESCRIPTION OF THE DRAWINGS

So that those skilled in the art to which the subject disclosure appertains will readily understand how to make and use the devices and methods of the subject disclosure without undue experimentation, embodiments thereof will be described in detail herein below with reference to certain figures, wherein.

DETAILED DESCRIPTION

Figure 1:
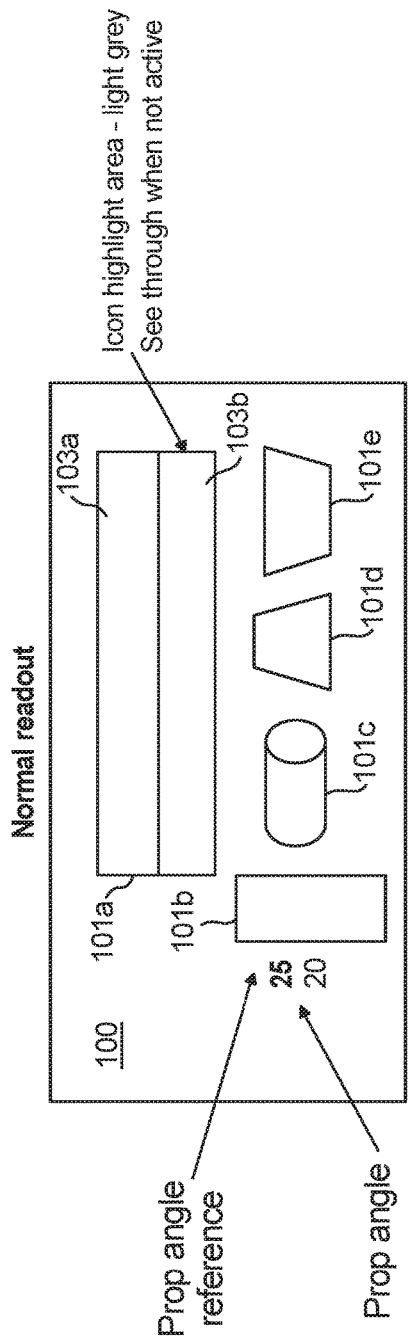
FIG. 1 is a schematic view of an embodiment of a system indicator region of a display in accordance with this disclosure, showing a plurality of embodiments of indicators in a normal indication state.
Figure 2:
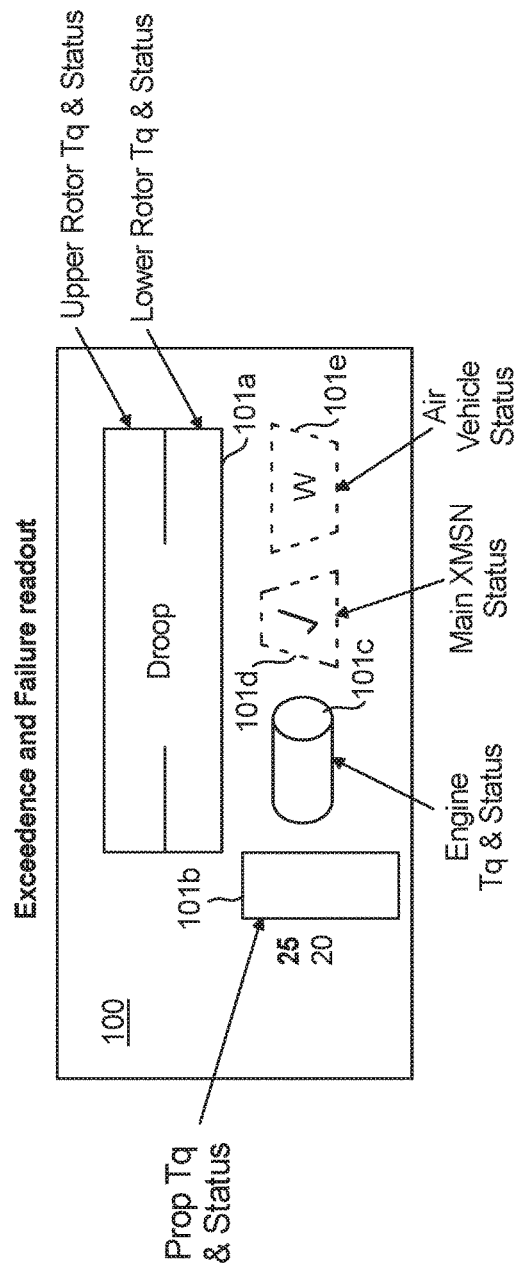
FIG. 2 is a schematic view of the system indicator region of FIG. 1, showing the plurality of embodiments of indicators in an alert state.

Reference will now be made to the drawings wherein like reference numerals identify similar structural features or aspects of the subject disclosure. For purposes of explanation and illustration, and not limitation, an illustrative view of an embodiment of a system indicator arrangement in accordance with the disclosure is shown in FIGS. 1 and 2, and is designated generally by reference character 100. Other embodiments and/or aspects of this disclosure are shown in FIGS. 2-15. The systems and methods described herein can be used to improve cockpit operations in an aircraft (e.g., a helicopter).

Referring generally to FIGS. 1 and 2, embodiments of a computer implemented method for displaying aircraft systems information on an aircraft display relating to and facilitating operation of an aircraft are disclosed herein. The method can include displaying a plurality of system indicators 101*a, b, c, d, e* in a system indicator region 100 of an aircraft display. At least two of the indicators 101*a, b, c, d, e* of the plurality of system indicators 100 in the system indicator region 100 are disposed in a structurally approximated relationship relative to each other to increase system recognition and/or interpretation of status of a corresponding physical system indicated by each indicator 101*a, b, c, d, e*. In at least some embodiments, the term "structurally approximated relationship" means that the systems are shown disposed in a representation that depicts where the systems are located physically relative to each other (e.g., a rotor on top of a fuselage, a propeller in front or behind a fuselage) which can allow quick recognition of the system.

In certain embodiments, at least one of the plurality of system indicators 101*a, b, c, d, e* can include a representative image having a shape similar to the corresponding physical system and/or a component thereof. For example the plurality of system indicators 101*a, b, c, d, e* include a least one of a main rotor indicator 101*a*, a secondary rotor indicator 101*b*, an engine system indicator 101*c*, a transmission system indicator 101*d*, and/or an air vehicle status indicator 101*e*.

In certain embodiments, the engine system indicator 101*c*, the transmission system indicator 101*d*, and the air vehicle status indicator 101*e* can be displayed below the main rotor indicator 101*a*. In certain embodiments, the secondary rotor indicator 101*b* can be disposed behind the main rotor indicator 101*a* (e.g., for rotorcraft with forward prolusion systems).

In certain embodiments, the main rotor indicator 101*a* can include at least one horizontal rectangular shape (e.g., with a sub rectangle 103*a*, 103*b* as shown for each main rotor such as an upper and lower rotor). In certain embodiments, the secondary rotor 101*b* includes at least one vertical rectangular shape as shown. In certain embodiments, the engine system indicator 101*c* can include a cylindrical shape (e.g., to symbolize a shaft).

In certain embodiments, one or more of the indicators 101*a, b, c, d, e* can be a first color (e.g., light gray, green, and/or at least partially transparent), a first outline (e.g., solid), and/or at a first illumination (e.g., not illuminated or almost transparent) in a normal indication state as shown in FIG. 1. As shown in FIG. 2, one or more of the indicators 101*a, b, c, d, e* can be a second color (e.g., yellow, red) and/or a second outline (e.g., solid or dashed) and/or second illumination (e.g., bright) at an alert state.

In certain embodiments, the normal indication state can be a normal operating condition of the aircraft system corresponding to each indicator. For example, the first color can be transparent, or the first illumination can be less than the second illumination as shown in FIG. 1. In certain embodiments, the alert state can be a caution and/or failure state of the aircraft system corresponding to each indicator. For example, the second color can be opaque or brighter than the first color, or wherein the second illumination can be greater than the first illumination as shown in FIG. 2.

Figure 3:
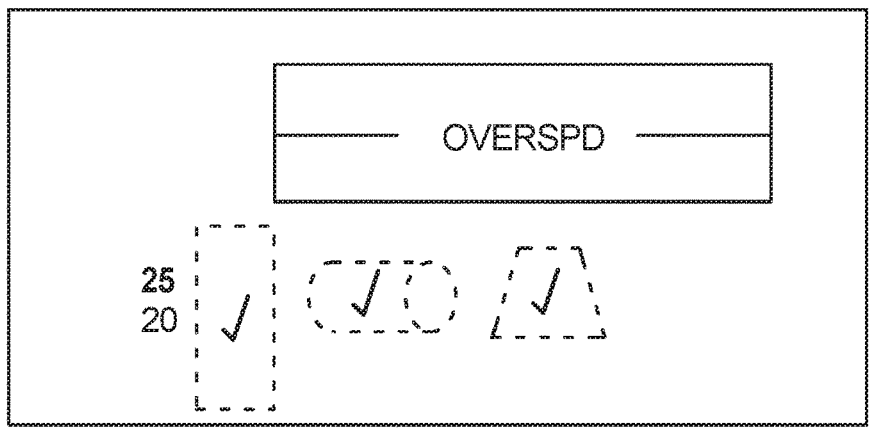
FIG. 3-7 are schematic views of the system indicator region of FIG. 1, showing the plurality of embodiments of indicators in various alert states.
Figure 4:
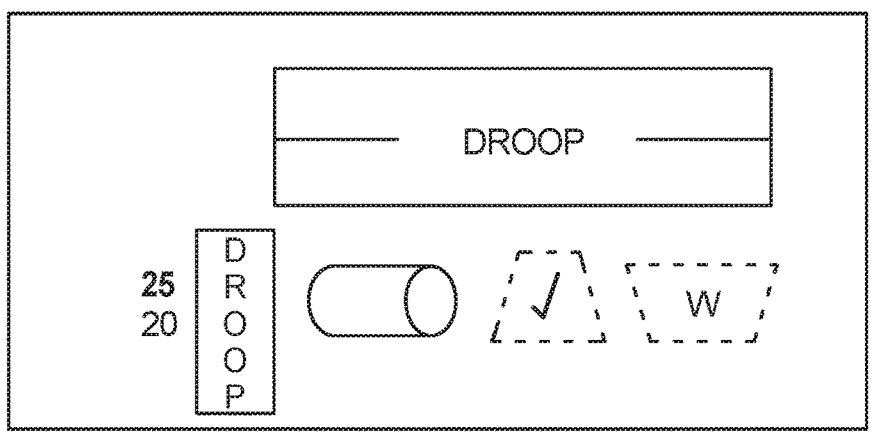
Figure 5:
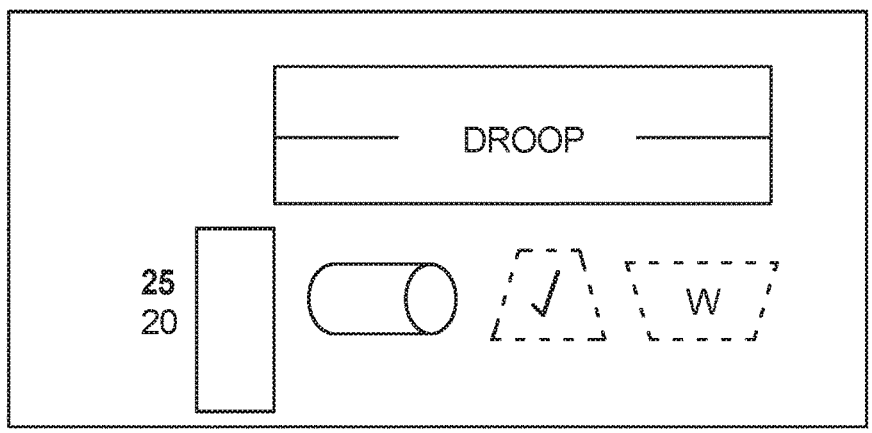
Figure 6:
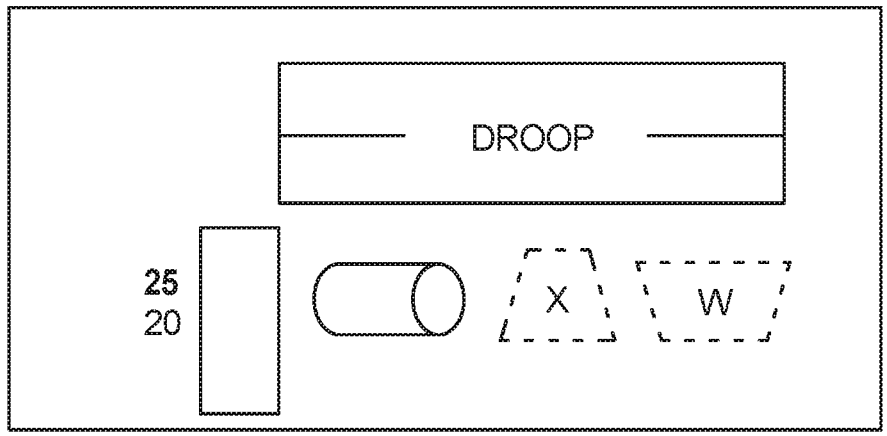

In certain embodiments, at least one of the indicators 101*a, b, c, d, e* can include a text and/or symbol within the indicator 101*a, b, c, d, e* to signify a state of the indicator 101*a, b, c, d, e* or the corresponding aircraft system. For example, as shown, at low rotor speeds, the main rotor indicator 101*a* and/or the secondary rotor indicator 101*b* can include the term "DROOP" within the indicator in the second state. Referring to FIG. 3, high rotor speeds can cause the term "OVERSPD" to appear in the indicator 101*a* in certain embodiments.

Figure 7:
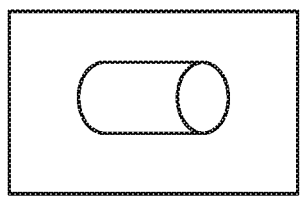

Certain indicators 101*a, b, c, d, e* may include a plurality of alert states to indicate one or more conditions, but it is contemplated that one or more of the indicators 101*a, b, c, d, e* may have only one alert state. Referring additionally to FIGS. 3-6, in certain embodiments, one or more of the indicators 101*a, b, c, d, e* can include one or more reference symbols, e.g., a check mark, an "x", or any other suitable letter/symbol, which can signify are particular state of a system and/or refer a user to a more detailed breakdown of system issues on a separate display. Referring to FIG. 7, it is contemplated that certain states may not require any text or symbols within the indicators. Also, as shown, it is contemplated that a portion of an indicator (e.g., top sub-rectangle 103*a* of main rotor indicator 101*a*) can be a different color (e.g., green) than another portion of the indicator. Any colors, shades, outline types, symbols, text, illuminations, and/or shapes are contemplated herein for use as a system indicator in one or more states thereof.

Figure 8:
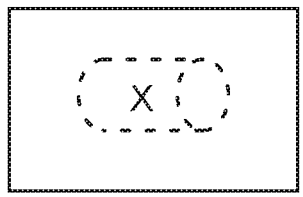
FIG. 8-10 are schematic view of an embodiment of an engine system indicator in various alert states.
Figure 9:
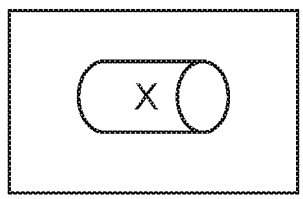
Figure 10:
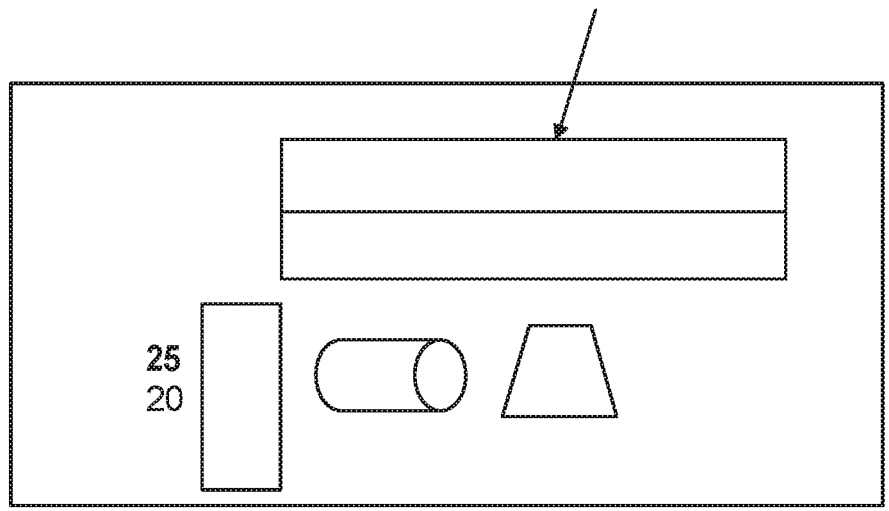

For example, as shown in FIGS. 8-10, the engine system indicator 101*c* can include a solid outline alert (FIG. 8, e.g., for signifying abnormal torque), a dashed outline alert with a reference symbol (FIG. 9, e.g., an "x" in a dashed outline for indicating no abnormal torque, but one or more other engine system abnormalities), or both a solid outline and a reference symbol (e.g., as shown in FIG. 10, to signify both torque and one or more other abnormalities).

Figure 11:
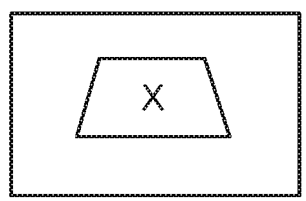
FIG. 11 is a schematic view of an embodiment of a transmission system indicator.

Referring to FIG. 11, an embodiment of a transmission system indicator 101*d* is shown having a solid gray outline and an "x" within the box to indicate a check status. However, as shown in other figures, the transmission system indicator 101*d* can include a dashed outline in an alert condition and/or any suitable symbol (e.g., a check mark) to indicate to a user to check the transmission status on a more detailed display.

Figure 12:
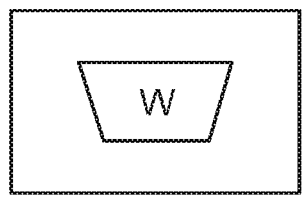
FIG. 12 is a schematic view of an embodiment of a transmission system indicator.

Referring to FIG. 12, an embodiment of an air vehicle status indicator 101*e* is shown having a solid gray outline and the letter "W" disposed therein. The air vehicle status indicator 101*e* can include multiple alert states that can display any suitable symbols for example to indicate a particular alert. For example, the letter "W" as shown can be used to indicate that a weapons system is degraded and/or failed (e.g., such that a selected weapon is not able to be fired). The letter "A" can be used to indicate another type of air vehicle system (e.g., vehicle management system (VMS), electrical power systems (EPS), and/or flight control system (FCS)) is degraded or failed. In certain embodiments, the letter "M" can be used to indicate an MEP system is degraded and/or failed. Any suitable symbols (e.g., F, M, V, E) are contemplated herein.

It is contemplated that multiple symbols may be displayed in a single indicator at a given time where there are multiple alerts. However, if the amount of symbols in a single indicator is limited (e.g., to one), then a symbol (e.g., a check mark or an "x") can indicate that there are multiple alerts and a user must check the system for the alerts (e.g., on a more detailed readout of system information).

Figure 13:
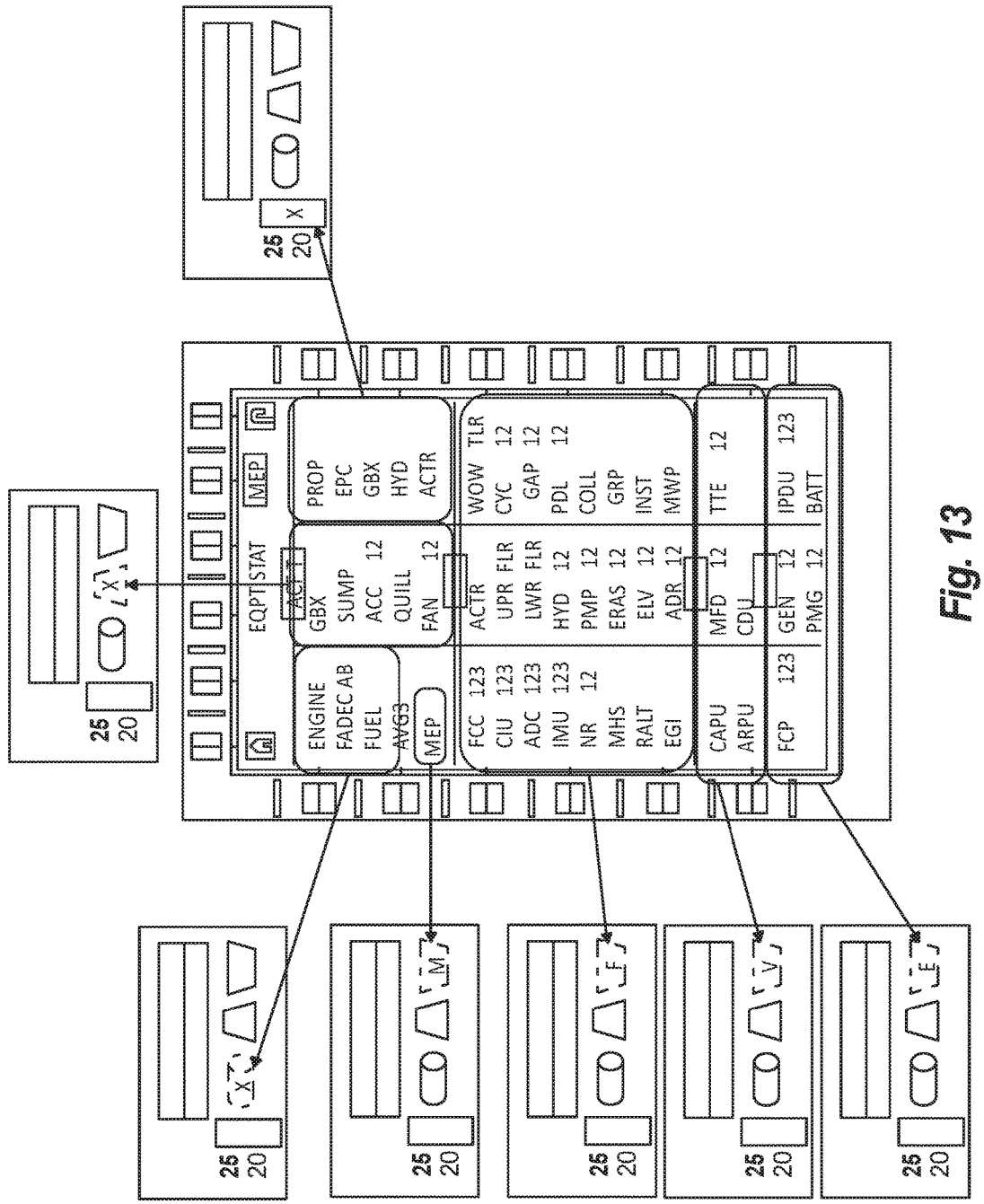
FIG. 13 is a schematic view of an embodiment of a readout correlation between embodiments of alert states of certain indicators and a more detailed equipment status display.

Referring to FIG. 13, a readout correlation between embodiments of alert states of certain indicators and an embodiment of a more detailed equipment status display is shown. For example, certain symbols (e.g., letters) in the air vehicle status indicator can refer the user to certain systems for further/more detailed examination by the user.

Figure 14:
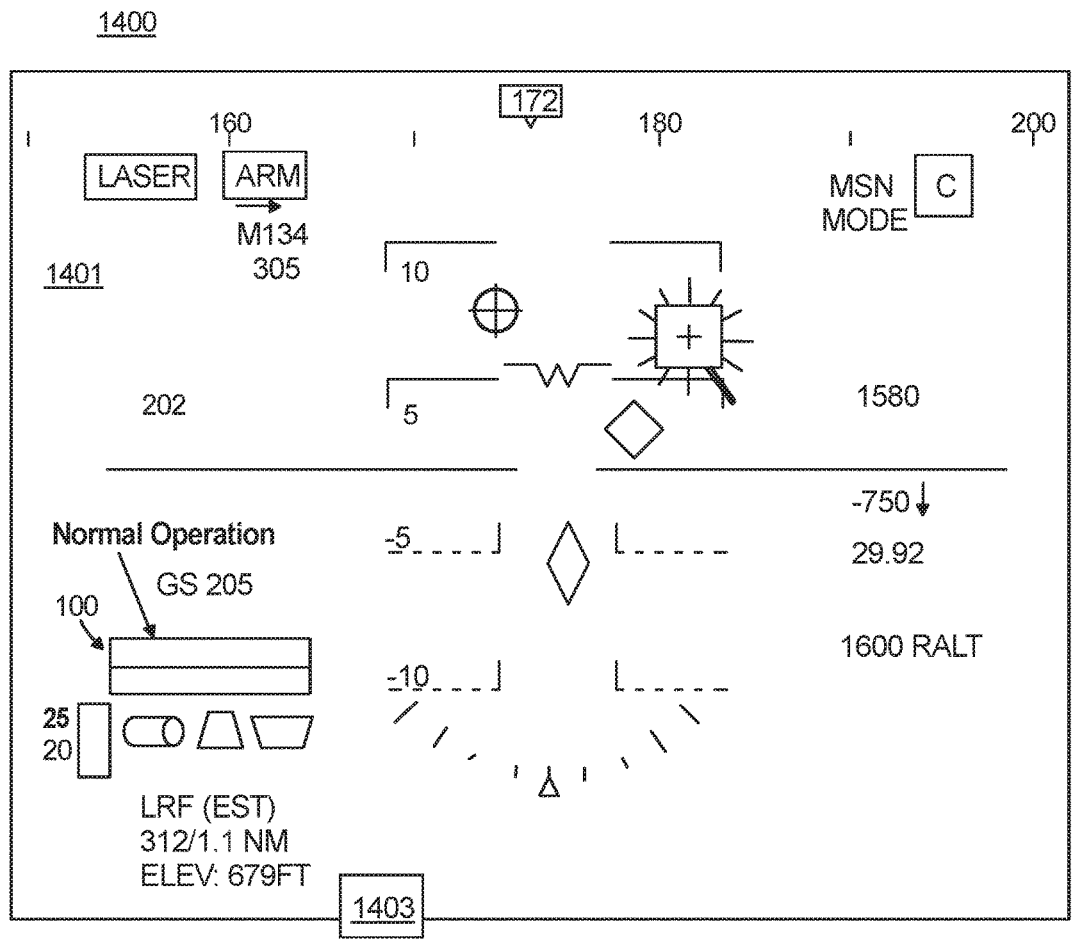
FIG. 14 is a schematic view of an embodiment of the aircraft display (e.g., a head mounted display (HMD), a heads up display (HUD)), shown having an embodiment of a system indicator region with indicators in a normal indication state.
Figure 15:
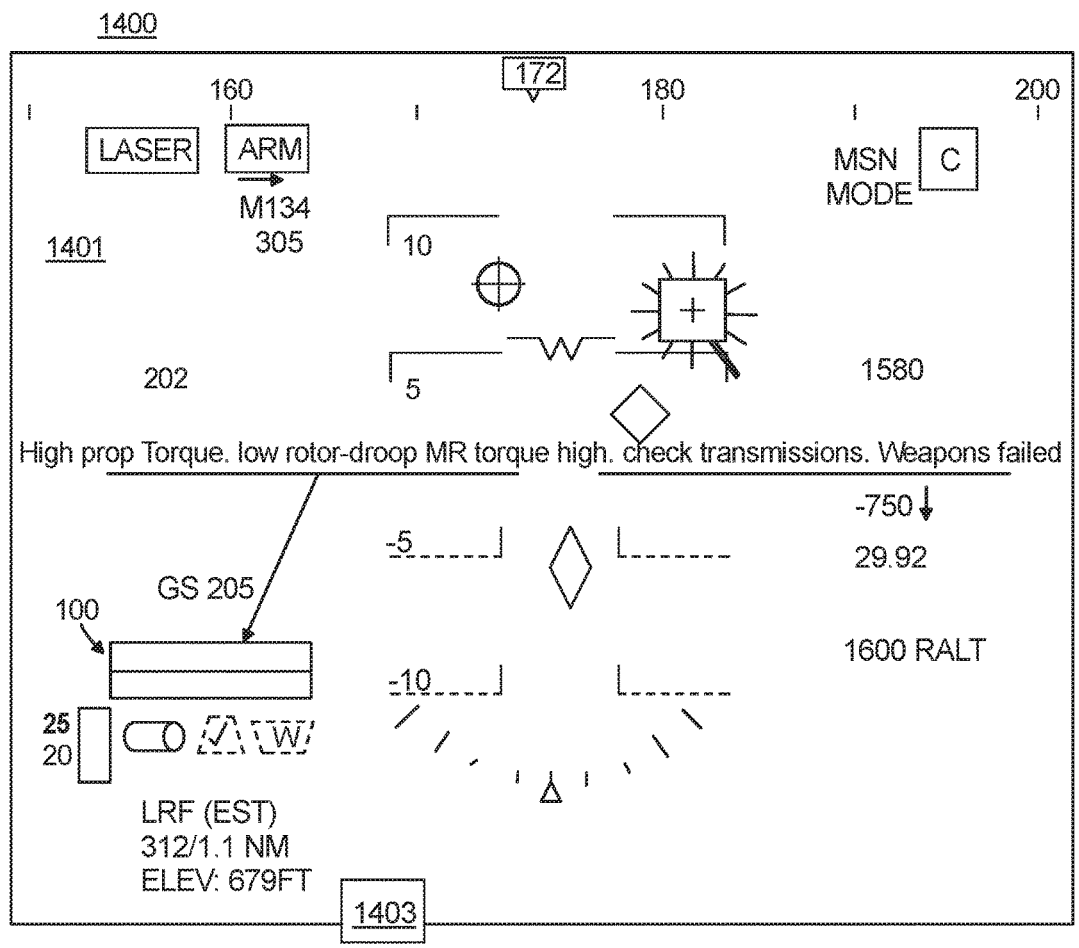
FIG. 15 is a schematic view of the aircraft display of FIG. 14, shown having an embodiment of a system indicator region with indicators in an alert state.

Referring to FIGS. 14 and 15, in accordance with at least one aspect of this disclosure, an aircraft display system 1400 can include a display 1401 configured to display information to a pilot or crew of the aircraft, and an aircraft computer 1403 operatively connected to the display 1401. The computer 1403 can be configured to execute any suitable embodiment of a method and/or any suitable portion as disclosed herein such that a system indicator region 100 as described above is displayed on a portion of the display 1401. The system 1400 can include any other suitable components (e.g., sensor systems or any other suitable system that monitors one or more systems of the aircraft to provide the aircraft computer 1403 with information regarding the various systems). For example, the engine system indicator 101c can show engine power status, e.g., such that it is in an alert state when there is over torqueing and/or over temperature limit (e.g., torque for low altitudes, temp for high altitude), and this information can be obtained via one or more engine sensors operatively connected to the aircraft computer 1403.

In accordance with at least one aspect of this disclosure, a non-transitory computer readable medium comprising computer executable instructions for performing a method for displaying aircraft systems information on an aircraft display relating to and facilitating operation of an aircraft, the method being any suitable embodiment of a method and/or any suitable portion thereof as disclosed.

Embodiments provide an intuitive pictorial representation of rotary wing power and system status monitoring. Embodiments provide a graphical/pictorial representation of the certain aircraft systems to be monitored by the pilot, to ensure the air vehicle maintains safe operation. Embodiments can provide a context based graphical representation of aircraft state that can be displayed on any suitable display (e.g., an HMD, a Heads-up or Heads-down type display) in a minimal footprint, allowing the remainder of display space for other functions. Embodiments improve crew situational awareness to the aircraft performance limits, as well as aircraft status.

By way of example, aspects of the invention can be used in coaxial helicopters, on tail rotors, or wings or propeller blades on fixed or tilt wing aircraft.

As will be appreciated by those skilled in the art, aspects of the present disclosure may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified herein.

The methods and systems of the present disclosure, as described above and shown in the drawings, provide for aircraft display systems with superior properties. While the apparatus and methods of the subject disclosure have been shown and described with reference to embodiments, those skilled in the art will readily appreciate that changes and/or modifications may be made thereto without departing from the spirit and scope of the subject disclosure.

What is claimed is:

1. A computer implemented method for displaying aircraft systems information on an aircraft display relating to and facilitating operation of an aircraft, comprising;
    displaying a plurality of system indicators in a system indicator region, wherein the plurality of system indicators in the system indicator region are disposed in a structurally approximated relationship relative to each other to increase system recognition and/or interpretation of status of a corresponding physical system indicated by each indicator;
    wherein disposed in the structurally approximated relationship defines that the plurality of system indicators are positionally disposed to reflect physical locations of systems relative to each other on the aircraft.

2. The method of claim 1, wherein displaying includes displaying the plurality of system indicators such that at least one of the indicators can include a text or symbol within the indicator to signify a state of the indicator or corresponding aircraft system.

3. The method of claim 1, wherein displaying includes displaying the plurality of system indicators such that at least one of the plurality of system indicators include a representative image having a shape similar to the corresponding physical system and/or a component thereof.

4. The method of claim 1, wherein displaying includes displaying the plurality of system indicators such that the plurality of system indicators include a least one of a main rotor indicator, an engine system indicator, a transmission system indicator, an air vehicle status indicator, and/or a secondary rotor indicator.

5. The method of claim 4, wherein displaying includes displaying the plurality of system indicators such that the engine system indicator, the transmission system indicator, and the air vehicle status indicator are displayed below the main rotor indicator.

6. The method of claim 5, wherein displaying includes displaying the plurality of system indicators such that the secondary rotor indicator is disposed behind the main rotor indicator.

7. The method of claim 6, wherein displaying includes displaying the plurality of system indicators such that the main rotor indicator includes at least one horizontal rectangular shape.

8. The method of claim 7, wherein displaying includes displaying the plurality of system indicators such that the secondary rotor includes at least one vertical rectangular shape.

9. The method of claim 8, wherein displaying includes displaying the plurality of system indicators such that the engine system indicator includes a cylindrical shape.

10. The method of claim 1, wherein displaying includes displaying the plurality of system indicators such that one or more of the indicators are a first color, a first outline, and/or at a first illumination in a normal indication state and are a second color and/or second illumination at an alert state.

11. The method of claim 10, wherein the normal indication state is a normal operating condition of the aircraft system corresponding to each indicator, wherein the first color is transparent, or wherein the first illumination is less than the second illumination.

12. The method of claim 10, wherein the alert state is a caution and/or failure state of the aircraft system corresponding to each indicator, wherein the second color is opaque or brighter than the first color, or wherein the second illumination is greater than the first illumination.

13. An aircraft display system, comprising:
    a display configured to display information to a pilot or crew of the aircraft; and
    an aircraft computer operatively connected to the display, the computer configured to execute the method of claim 1.

14. A non-transitory computer readable medium comprising computer executable instructions for performing a method for displaying aircraft systems information on an aircraft display relating to and facilitating operation of an aircraft, the method comprising:
    displaying a plurality of system indicators in a system indicator region, wherein the plurality of system indicators in the system indicator region are disposed in a structurally approximated relationship relative to each other to increase system recognition and/or interpretation of status of a corresponding physical system indicated by each indicator;
    wherein disposed in the structurally approximated relationship defines that the plurality of system indicators are positionally disposed to reflect, physical locations of systems relative to each other on the aircraft.

15. The non-transitory computer readable medium of claim 14, wherein displaying includes displaying the plurality of system indicators such that at least one of the plurality of system indicators include a representative image having a shape similar to the corresponding physical system and/or a component thereof.

16. The non-transitory computer readable medium of claim 15, wherein displaying includes displaying the plurality of system indicators such that the plurality of system indicators include a least one of a main rotor indicator, an engine system indicator, a transmission system indicator, an air vehicle status indicator, and/or a secondary rotor indicator.

17. The non-transitory computer readable medium of claim 16, wherein displaying includes displaying the plurality of system indicators such that the engine system indicator, the transmission system indicator, and the air vehicle status indicator are displayed below the main rotor indicator.

18. The non-transitory computer readable medium of claim 17, wherein displaying includes displaying the plurality of system indicators such that the secondary rotor indicator is disposed behind the main rotor indicator.

19. The non-transitory computer readable medium of claim 18, wherein displaying includes displaying the plurality of system indicators such that the main rotor indicator includes at least one horizontal rectangular shape.

20. The non-transitory computer readable medium of claim 19, wherein displaying includes displaying the plurality of system indicators such that the secondary rotor includes at least one vertical rectangular shape.

* * * * *